United States Patent
Feldtkeller (10) Patent No.: US 6,999,324 B2
(45) Date of Patent: Feb. 14, 2006

(54) METHOD FOR OPERATING A SWITCH IN A FREE-RUNNING SWITCH MODE POWER SUPPLY, AND A DRIVE CIRCUIT FOR A SWITCH IN A FREE-RUNNING SWITCH MODE POWER SUPPLY

(75) Inventor: Martin Feldtkeller, München (DE)

(73) Assignee: Infineon Technologies AG, Munich (DE)

( * ) Notice: Subject to any disclaimer, the term of this patent is extended or adjusted under 35 U.S.C. 154(b) by 73 days.

(21) Appl. No.: 10/661,337

(22) Filed: Sep. 12, 2003

(65) Prior Publication Data

US 2004/0057256 A1    Mar. 25, 2004

(30) Foreign Application Priority Data

Sep. 12, 2002  (DE)  ................................. 102 42 218

(51) Int. Cl.
*H02M 3/335*    (2006.01)
(52) U.S. Cl. .................... 363/19; 363/97; 363/21.04
(58) Field of Classification Search .............. 363/21.8, 363/21.5, 21.13, 21.9, 21.12, 21.16, 21; 323/222, 323/283, 288, 285
See application file for complete search history.

(56) References Cited

U.S. PATENT DOCUMENTS 5,675,485 A * 10/1997 Seong .......................... 363/97
5,940,281 A * 8/1999 Wolf ......................... 363/21.08
6,229,716 B1   5/2001 Preller
6,825,644 B2 * 11/2004 Kernahan et al. ........... 323/283

FOREIGN PATENT DOCUMENTS

| DE | 196 35 355 C2 | 3/1998 |
| DE | 197 32 169 A1 | 4/1999 |
| DE | 102 09 834 A1 | 10/2002 |

OTHER PUBLICATIONS

F. Lin et al.: "Reduction of Power Supply EMI Emission by Switching Frequency Modulation", *IEEE Transactions on Power Electronics*, vol. 9, No. 1, Jan. 1994, pp. 132-137.
Tetsuro Tanaka et al.:"Random-Switching Control In DC-To-DC Converters", *IEEE*, 1989, pp. 500-507, Order No. CH2721-9/89/0000-0500, no date.

\* cited by examiner

*Primary Examiner*—Rajnikant B. Patel
(74) *Attorney, Agent, or Firm*—Laurence A. Greenberg; Werner H. Stemer; Ralph E. Locher

(57) ABSTRACT

A method for operating a switch, which is connected in series with a primary coil of a transformer in a free-running switch mode power supply, includes the provision of a modulation signal and the provision of a drive signal for the switch. The drive signal includes a recurrent pulse sequence which has at least one first switching-on pulse with a first pulse duration and at least one second switching-on pulse with a second pulse duration, and with the pulse duration of at least one of the switching-on pulses being modulated by the modulation signal within a range of valves which is predetermined by the control signal.

16 Claims, 6 Drawing Sheets

METHOD FOR OPERATING A SWITCH IN A FREE-RUNNING SWITCH MODE POWER SUPPLY, AND A DRIVE CIRCUIT FOR A SWITCH IN A FREE-RUNNING SWITCH MODE POWER SUPPLY

BACKGROUND OF THE INVENTION

Field of the Invention

The present invention relates to a method for operating a switch in a free-running or quasi-resonant switch mode power supply. The switch is connected in series with a primary coil of a transformer, in the free-running switch mode power supply. An input voltage is applied via the series circuit formed by the primary coil and the switch, with a secondary coil of the transformer being coupled to output terminals at which an output voltage is produced. A control signal that determines the power consumption is provided and the switch is in each case being switched on when the primary coil reaches a predetermined magnetization state.

Free-running switch mode power supplies have been known for a long time for supplying DC voltages to loads, such as computers, monitors, televisions or the like. The basic configuration and the method of operation of such switch mode power supplies are described, for example, in Published, Non-Prosecuted German Patent Application DE 197 32 169 A1, corresponding to U.S. Pat. No. 6,229,716. Integrated circuits are normally used for operating the switch which is provided to control the power consumption in such power supply units, such as drive modules of the TDA 4605 or TDA 16846 type, which are available from the Applicant.

Figure 1:
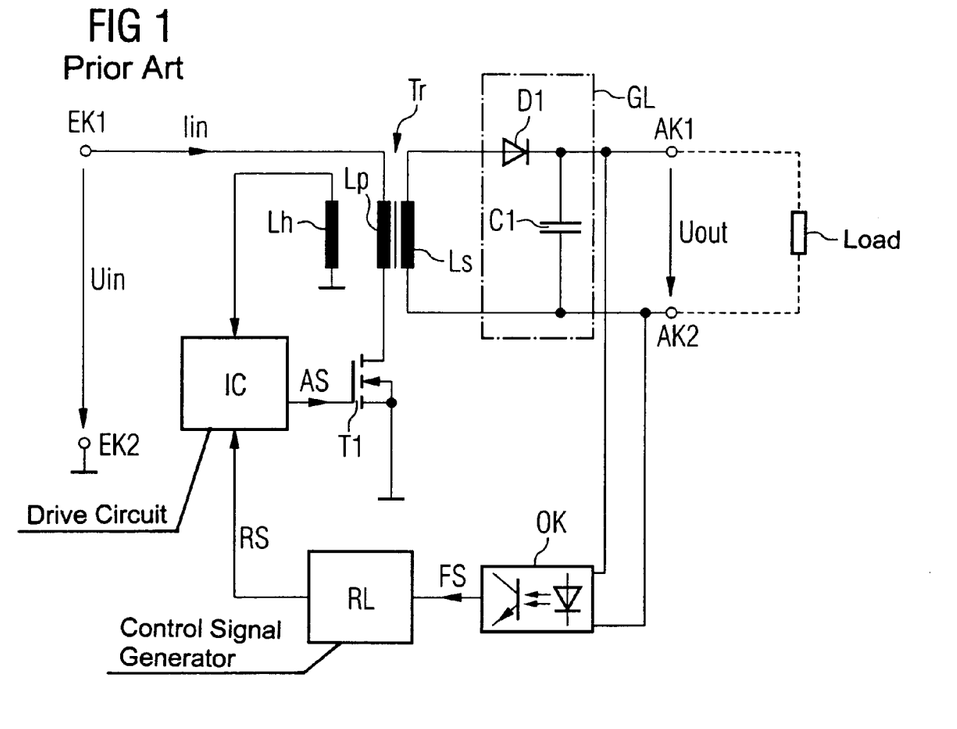
FIG. 1 is a circuit diagram of a free-running switch mode power supply according to the prior art.

In order to assist understanding of the invention which will be explained in the following text, the basic configuration and the basic method of operation of a conventional free-running flyback converter switch mode power supply will first be explained, with reference to FIGS. 1 and 2.

The switch mode power supply has input terminals EK1, EK2 for application of a rectified input voltage Uin, and output terminals AK1, AK2 for providing an output voltage Uout for a load. A transformer Tr is provided to convert the input voltage Uin to the output voltage Uout, with the primary coil Lp of the transformer Tr being connected in series with a semiconductor switch T1 between the input terminals EK1, EK2, and its secondary coil Ls being connected via a rectifier configuration GL to the output terminals AK1, AK2. In a flyback converter switch mode power supply such as this, the primary coil Lp draws energy from the input voltage Uin while the switch is closed, and emits the energy to the load via the secondary coil Ls and the rectifier configuration GL when the switch T1 is subsequently closed.

The object of power supply units such as these is to keep the output voltage Uout largely constant irrespective of fluctuations in the power consumption of the load. A control loop is provided to control the output voltage or the power consumption of the switch mode power supply and has a control signal RS which is derived from the output voltage Uout and governs the power consumption of the switch mode power supply. The control signal RS is supplied to a drive circuit IC, which provides a drive signal AS for operating the switch T1 in a clocked manner.

The drive signal contains a sequence of drive pulses, with the time duration of the individual drive pulses, that is to say the time for which the switch T1 is switched on, being dependent on a control signal and rising as the power consumption of the load rises, in order to keep the output voltage Uout constant. The times at which the switch T1 is closed in a free-running/quasi-resonant switch mode power supply are governed by times at which the primary coil Lp has emitted the previously stored energy to the secondary Ls, and is thus demagnetized. Magnetization states of the primary coil Lp are detected by an auxiliary coil Lh, which is coupled to the primary coil Lp and is likewise connected to the drive circuit IC.

Figure 2:
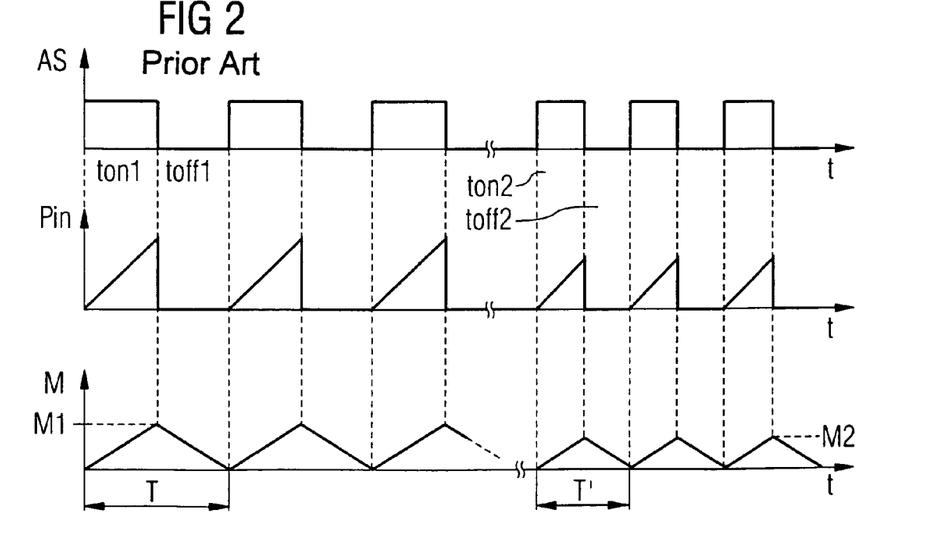
FIG. 2 is a graph showing time profiles of selected signals in a free-running switch mode power supply according to the prior art.

By way of example, FIG. 2 shows a time profile of the drive signal AS, the power consumption Pin and the magnetization M of the primary coil Lp, with the signal profiles in each case being shown for a first value of the control signal RS in the left-hand part, and for a second value of the control signal RS in the right-hand part. The first control signal value RS results in switched-on durations of length ton1, and the second control signal value results in switched-on durations of length ton2.

When the switch T1 is closed, an input current Iin in each case rises linearly, starting from zero. The power consumption Pin is proportional to the current drawn and has the ramp-shaped profile as illustrated, assuming that the input voltage Uin is constant. In a corresponding way, the magnetization M rises linearly after being switched on and falls linearly once again after being switched off, during the time periods toff1, toff2, with the switch T1 being switched on again when the magnetization has decreased to zero. The demagnetization time is in this case proportional to the magnetization time.

A drive cycle T, T' is governed by the time duration between the start of two successive switching-on pulses. The energy that is consumed by the switch mode power supply is proportional to the area under the curve of the power consumption Pin and is proportional to the area under the curve of the magnetization M. The mean power consumed is obtained from the energy consumed in each drive cycle. On the assumption that the input voltage Uin is constant for at least a number of drive cycles, the mean power level is proportional to the switched-on duration ton1, ton2, and is thus proportional to the control signal RS.

In contrast to the situation in switch mode power supplies with fixed clocking, the instantaneous switching frequency in free-running quasi-resonant switch mode power supplies varies with the power consumption of the load, with the information about the power consumption being fed back via the control signal to the drive circuit for the switch. Free-running switch mode power supplies are therefore advantageously used in particular in televisions where, owing to the constantly changing picture information and the dynamic range of the audio signal, the load varies continuously, so that the switching frequency of the power supply unit also varies continuously and electromagnetic interference from the switch mode power supply on narrowband receiving circuits, such as tuners etc., in each case acts for only a short time and does not lead to interference with the picture.

A further advantage of free-running flyback converter switch mode power supplies is their high efficiency. They are therefore increasingly being used for compact power supply units in enclosed plastic housings, since the maximum amount of heat that can be emitted from housings such as these is severely limited. In the case of loads such as notebooks, flat screens, chargers and electronic musical instruments, the power consumption may remain constant over a lengthy time period, which results in that the operating frequency of the switch mode power supply also correspondingly remains constant over a lengthy time period. This can result in high level peaks at specific frequencies, which necessitate additional suppression filters in order not to exceed the maximum permissible values for the emitted radiated electromagnetic interference.

SUMMARY OF THE INVENTION

It is accordingly an object of the invention to provide a method for operating a switch in a free-running switch mode power supply, and a drive circuit for a switch in a free-running switch mode power supply that overcome the above-mentioned disadvantages of the prior art devices and methods of this general type, which controls the power consumption with the effects of emitted radiated electromagnetic interference being reduced, without any complex shielding measures being required for this purpose, even when the power consumption of a load which is connected to the power supply unit remains constant for a lengthy time period.

With the foregoing and other objects in view there is provided, in accordance with the invention, a method for operating a switch connected in series with a primary coil of a transformer in a free-running switch mode power supply, a secondary coil of the transformer being coupled to output terminals carrying an output voltage, and the switch being switched on when the primary coil reaches a predetermined magnetization state. The method includes applying an input voltage to a series circuit formed by the primary coil and the switch, providing a control signal for controlling power consumption, providing a modulation signal, and providing a drive signal for driving the switch. The drive signal contains a recurrent pulse sequence having at least one first switching-on pulse with a first pulse duration and at least one second switching-on pulse with a second pulse duration. A pulse duration of at least one of the first and second switching-on pulses is modulated by the modulation signal within a range predetermined by the control signal.

The method according to the invention for operating the switch, which is connected in series with the primary coil of the transformer, in the free-running switch mode power supply, in which a control signal which governs the power consumption is produced, results in the provision of the modulation signal and the production of the drive signal for the switch. The drive signal has a recurrent pulse sequence with at least one first switching-on pulse with a first pulse duration and at least one second switching-on pulse, which follows the at least one first switching-on pulse in time and has a second pulse duration, with the pulse duration of at least one of the switching-on pulses being modulated on the basis of the modulation signal within a range which is predetermined by the control signal. The overall time for which the at least one first switching-on pulse and the at least one second switching-on pulse are switched on in the recurrent pulse sequence is in this case chosen to be dependent on the control signal, such that a mean power level which is consumed via the input terminals in each pulse sequence remains at least approximately constant, assuming that the control signal remains the same.

As was explained in the introduction, the energy which is consumed in each drive cycle, that is to say per drive pulse or switching-on pulse, in a free-running switch mode power supply is dependent on the time for which the switch is switched on. While a drive signal with periodically recurrent switching-on pulses with the same pulse duration is produced in conventional free-running switch mode power supplies, assuming that the power consumption is constant, a drive cycle with the method according to the invention contains at least two switching-on pulses. The pulse duration of one of the two pulses varying on the basis of the modulation signal, even when the control signal remains the same from one drive cycle to the next, and the pulse duration of the other switching-on pulse is matched to the modulated pulse duration of the first pulse, such that the mean power level which is consumed in each drive cycle is at least approximately constant. The times for which the at least one first and second pulse are switched on are preferably matched to one another such that any fluctuation in the mean power level consumed per drive cycle fluctuates by less than 1% in each drive cycle with respect to a mean consumed power level determined over two or more drive cycles.

The fact that the pulse duration of the first and second switching-on pulses varies from one drive cycle to the next means that the switching frequency of the switch which is connected in series with the primary coil in the switch mode power supply in the method according to the invention varies from one drive cycle to the next, as a result of which emitted radiated electromagnetic interference is distributed over a wider frequency range even when the power consumption remains the same, and, in particular, this avoids peaks in a narrow frequency band in the emitted radiated interference.

One embodiment of the invention provides for the pulse duration of the at least one first switching-on pulse to be chosen to be proportional to the control signal, and for the pulse duration of the at least one second switching-on pulse to be chosen to be proportional to the first pulse duration, with the proportionality factor via which the second pulse duration depends on the first pulse duration being modulated within predetermined limits by the modulation signal. The proportionality factor by which the second pulse duration is dependent on the first pulse duration and the range within which the proportionality factor is modulated by the modulation signal is preferably chosen such that the energy consumption during the second switching-on pulse is less than the energy consumption during the first switching-on pulse. The pulse duration of the second switching-on pulse can in this case be modulated in order to vary the switching frequency, with the fluctuations that result from this in the power consumption during the second switching-on pulse having only a minor effect on the mean power consumption.

The pulse sequence preferably contains m first switching-on pulses with the first pulse duration and n second switching-on pulses with the second pulse duration, in order via this ratio m/n to set the proportion of the energy that is consumed during the second switching-on pulses to the energy that is consumed during the entire drive cycle. Preferably, m=2 and n=1.

In the embodiment of the method according to the invention in which there are two first switching-on pulses and one second switching-on pulse, the proportionality factor by which the second pulse duration depends on the first pulse duration is preferably between 0.3 and 0.5, and is varied within this range by the modulation signal.

The modulation signal that modulates the pulse duration of at least one of the switching-on pulses in the recurrent pulse sequence within predetermined limits is preferably a random signal or a pseudo-random signal.

The maximum power consumption of the free-running switch mode power supply is governed by the magnetic saturation of the transformer. In the method according to the invention, the maximum power consumption of the power supply unit is less since, owing to the desired time difference between the first and the second pulse duration, which is required for modulation of the switching frequency, saturation magnetization is not used, at least during one pulse in the pulse sequence of a drive cycle. In order to increase the maximum power consumption, one embodiment of the invention therefore provides for the range within which the time for which the at least one of the drive pulses in the recurrent pulse sequence is switched on, whose pulse duration is modulated by the modulation signal, to be made dependent on the maximum magnetization of the primary coil in each switching-on process. If the maximum magnetization in each switching-on process increases owing to increased power consumption by the load, then the modulation range is reduced and tends to zero, when the required power consumption is so high that the maximum magnetization (saturation) of the transformer is reached. The drive signal is not frequency modulated by the modulation signal at all when the power consumption is at its maximum.

The drive circuit according to the invention for a switch, which is connected in series with a primary coil of a transformer, in a free-running switch mode power supply has a first input terminal for supplying a control signal which determines the power consumption of the power supply unit, a second input terminal for supplying a magnetization signal which is dependent on the magnetization state of the primary coil, an output terminal for providing a drive signal, and a signal generating circuit to which the magnetization signal and a reference signal which is dependent on the control signal are supplied. The signal generating circuit provides a drive signal containing a sequence of switching-on pulses, with the start of a switching-on pulse in each case being predetermined by the magnetization signal, and with the pulse duration of a switching-on pulse being predetermined by the reference signal. A reference signal generating circuit is provided in order to produce the reference signal. The reference signal generating circuit is supplied with the control signal and has a signal generator that provides a modulation signal. The reference signal generating circuit also has a weighting circuit, to which the control signal and the modulation signal are supplied and which provides a control signal that is weighted on the basis of the modulation signal, as well as a changeover switch, as a function of whose switch position the control signal or the weighted control signal is supplied as the reference signal to the signal generating circuit. Depending on the switch position of the changeover switch in the reference signal generating circuit, the signal generating circuit produces first switching-on pulses whose first pulse duration is dependent on the control signal, or second switching-on pulses are produced whose second pulse duration is dependent on the control signal weighted by the modulation signal. The modulation signal in this case governs the proportionality factor between the second pulse duration and the first pulse duration. The changeover switch is operated, for example, by a counter that counts the switching-on pulses in the drive signal and switches the switch periodically in order in this way to produce a pulse sequence with a predetermined sequence pattern of first switching-on pulses and second-switching-on pulses. In one exemplary embodiment of the invention, the counter is configured such that it loads the switch for in each case two switching-on pulses in a switch position in which the control signal is supplied to the signal generating circuit, in order in this way to generate first drive pulses, and such that the switch is then switched for the duration of one switching-on pulse to a switch position in which the weighted control signal is supplied to the signal generating circuit, in order in this way to generate a second switching-on pulse.

Other features which are considered as characteristic for the invention are set forth in the appended claims.

Although the invention is illustrated and described herein as embodied in a method for operating a switch in a free-running switch mode power supply, and a drive circuit for a switch in a free-running switch mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Unless stated to the contrary, identical reference symbols denote identical components and signals with the same meaning in the figures. With regard to the basic configuration of a free-running switch mode power supply, the following explanation of the method according to the invention and of a drive circuit according to the invention refer to FIG. 1, including the reference symbols used in FIG. 1.

The method according to the invention for operating a switch, which is connected in series with a primary coil of a transformer, in a free-running switch mode power supply provides for the switch T1 to be operated by the drive signal AS which contains a recurrent pulse sequence having at least one first switching-on pulse with a first pulse duration and at least one second switching-on pulse with a second pulse duration, with at least one of the pulse durations being modulated as a function of a modulation signal.

Figure 3:
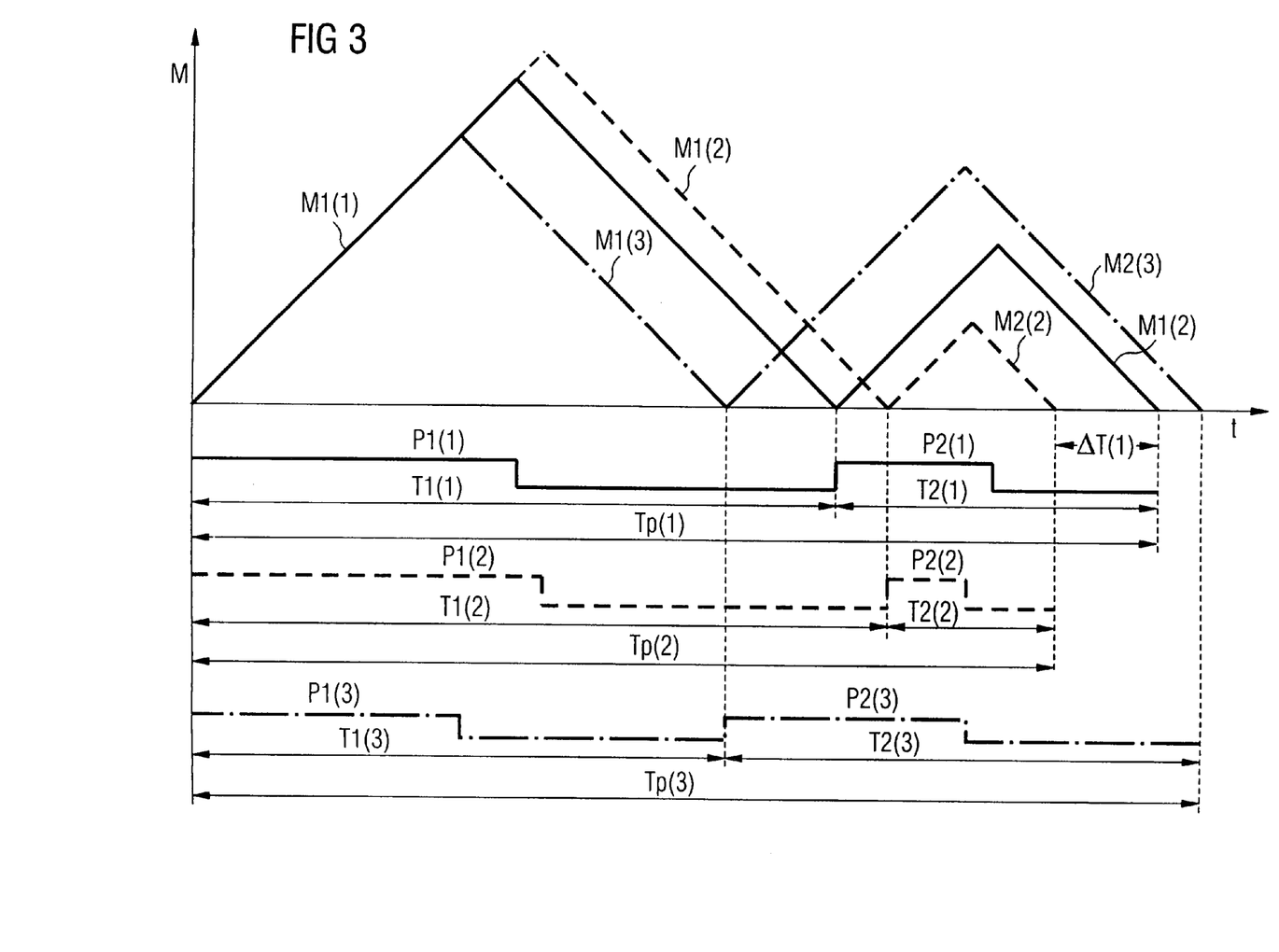
FIG. 3 is a graph showing time profiles of a drive signal which contains a recurrent pulse sequence with a first and a second switching-on pulse, and the magnetization caused by the drive signal in a primary coil of a transformer in a switch mode power supply, for three different drive cycles, according to the invention.

FIG. 3 shows time profiles of the drive signal AS which has a recurrent pulse sequence with a first switching-on pulse and a second switching-on pulse, and a magnetization M of the primary coil Lp resulting from the pulse sequences. FIG. 3 shows the pulse sequence of the drive signal for three drive cycles, with the pulse sequences in the individual drive cycles being shown differently, in order to distinguish between the pulse sequences. AS(1) denotes the pulse sequence during a first drive cycle, AS(2) denotes the pulse sequence during a second drive cycle, and AS(3) denotes the pulse sequence during a third drive cycle. The profile of the magnetization M and of the pulse sequence during the first drive cycle are shown by solid lines in FIG. 3, the profile during the second drive cycle is shown by dashed lines, and the profile during the third drive cycle is shown by dashed-dotted lines. The numbers (1), (2) and (3) are used to distinguish between the signals during the individual drive cycles, as will be explained in the following text.

In the example, each of the pulse sequences contains a first switching-on pulse P1 and a second switching-on pulse P2, which follows the first switching-on pulse P1 in time. The primary coil Lp is magnetized and is then demagnetized during the respective switching-on pulse, with the demagnetization duration being proportional to the duration of the respective switching-on pulse. The duration of the switching-on pulse P1 plus the subsequent demagnetization time is referred to in the following text as the first pulse duration T1, and the duration of the second switching-on pulse P2 plus the subsequent demagnetization time is referred to in the following text as the second pulse duration T2. Tp denotes the period duration of the pulse sequence with the first switching-on pulse P1 and the second switching-on pulse P2, and, in the illustrated example, results from the first pulse duration T1 plus the second pulse duration T2.

In the exemplary embodiment illustrated in FIG. 3, the first pulse duration T1 is modulated within predetermined limits from one drive circle to the next on the basis of a modulation signal MS. The energy which is consumed on the basis of the first switching-on pulse P1 is proportional to the area of the magnetization curve, which has a triangular profile, where M1 in FIG. 3 denotes that section of the magnetization curve which results from the first switching-on pulse, and M2 denotes that section of the magnetization curve which results from the second switching-on pulse P2. The energy, which corresponds to the integral under the magnetization curve, can be expressed as follows:

$$W = \tfrac{1}{2} \cdot a \cdot T1^2 + \tfrac{1}{2} \cdot a \cdot T2^2 \quad (1)$$

where W is the energy and a is a constant which takes account of the gradient of the magnetization curve and circuitry constants, such as the inductance of the transformer and the input voltage Uin.

A mean power level Pm consumed in each drive cycle is given by:

$$Pm = W/Tp \quad (2)$$

where the mean power level to be consumed is governed by the power consumption of the load, and the information about this power consumption is contained in the control signal RS. The time duration T2 of the second switching-on pulse P2 in the method according to the invention is thus matched to the time duration T1 of the first switching-on pulse P1 such that the mean power level Pm which is consumed remains constant, assuming that the control signal RS remains the same. The value of the second pulse duration for each value of the first pulse duration T1 as modulated by the modulation signal can be determined quite easily from the above equations (1) and (2). The fundamental effects of the variation of the first pulse duration T1 on the second pulse duration T2 while the mean power level Pm that is consumed remains the same are shown in FIG. 3. The solid line for the magnetization curve shows a first switching-on cycle with a first pulse duration T1 (1) and a second pulse duration T2 (1). If the first pulse duration is increased by virtue of the modulation, as is illustrated in the dashed profile for the second drive cycle, then the power consumption during the first switching-on pulse P1 is thus correspondingly increased. The second pulse duration T2 is correspondingly reduced, in order to keep the average power consumed throughout the entire period Tp constant. When the second pulse duration T2 is determined on the basis of the equations (1) and (2), this takes account of the fact that a reduction in the second pulse duration T2 reduces the energy consumption during the second switching-on pulse P2, but that this also results in a reduction in the total duration Tp by a time period ΔT(1) in comparison to the situation shown by the solid lines.

If the first pulse duration is reduced, as is illustrated by the dashed-dotted lines for the third drive cycle, then the second pulse duration must be increased in order to keep the total amount of energy which is consumed during the period duration Tp(3) constant. In the illustrated example, this results in the period duration Tp(3) being lengthened in comparison to the period duration Tp(1). The pulse durations T1 and T2 are in any case matched to one another such that the average power consumed during the period duration Tp is constant, with the period duration fluctuating in the explained manner as a result of the modulation, thus resulting in a frequency-modulated drive signal even when the control signal remains the same and the power consumption thus remains the same.

Figure 4:
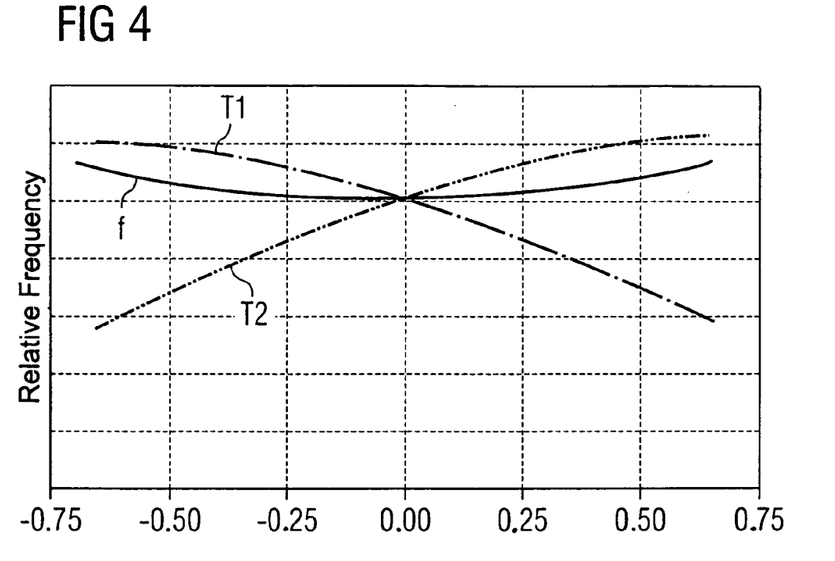
FIG. 4 is a graph showing an illustration of the switching frequency of the drive signal as a function of the time difference between a first pulse duration and a second pulse duration for a drive signal as shown in FIG. 3.

FIG. 4 shows changes in the switching frequency f relating to a normalized difference between the first pulse duration T1 and the second pulse duration T2. This clearly shows that modulation of the first pulse duration T1 and the matching, which results from this, of the second pulse duration T2 in order to maintain a constant mean power consumption results in frequency variations in the switching frequency of the drive signal. Emitted electromagnetic radiated interference, which results from the drive signal AS, is thus "smeared" over a predetermined frequency range with the method according to the invention, even when the power consumption of the load remains constant over a lengthy time period.

Figure 5:
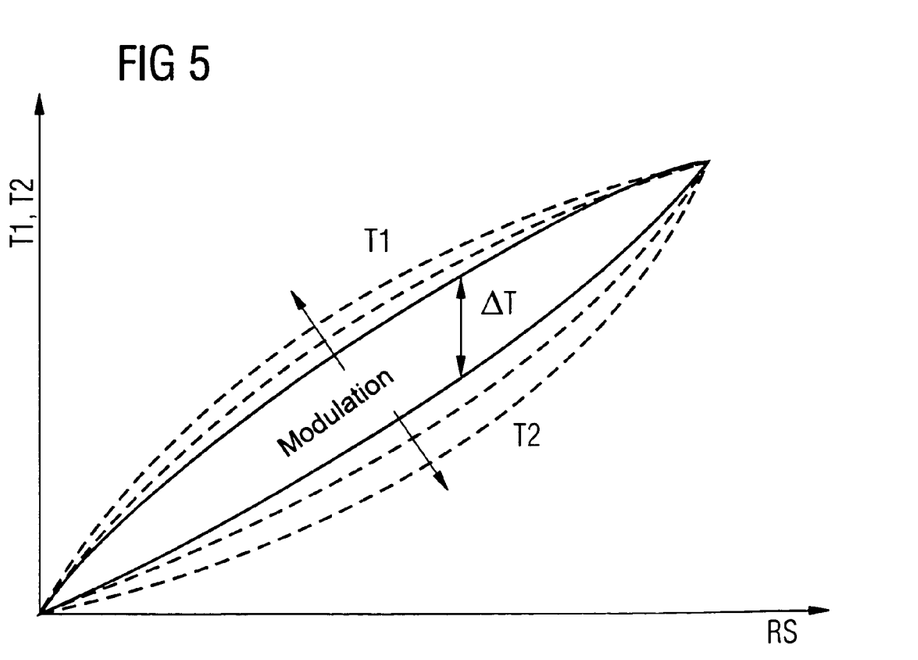
FIG. 5 is graph showing a schematic illustration of the variation of the first and second pulse durations as a function of the control signal.

FIG. 5 shows the fundamental dependency of the first pulse duration T1 and of the second pulse duration T2 on the control signal RS and on the power consumed by the load, respectively. This clearly shows that the first and second pulse durations T1, T2 increase as the control signal RS increases, in order to increase the power consumption, with the ratio of the pulse durations T1, T2 to one another being such that the second pulse duration T2 is shortened when the first pulse duration T1 is lengthened, and vice versa, in order to keep the mean power consumption constant. Δt in FIG. 5 denotes the time difference between the first pulse duration T1 and the second pulse duration T2. The time difference is preferably reduced as the power consumption increases and the control signal RS in consequence becomes greater, until the first and second pulse durations T1, T2 are of equal duration at the maximum power consumption, in order to make it possible to utilize the maximum power consumption of the power supply unit, which is limited by the saturation of the transformer.

The power consumption of the switch mode power supply is governed by the first pulse duration T1 and the second pulse duration T2, with at least one of the pulse durations being modulated by the modulation signal MS. The power to be consumed and hence the overall time for which the switch is switched on in each drive cycle are governed by the control signal RS.

Figure 6:
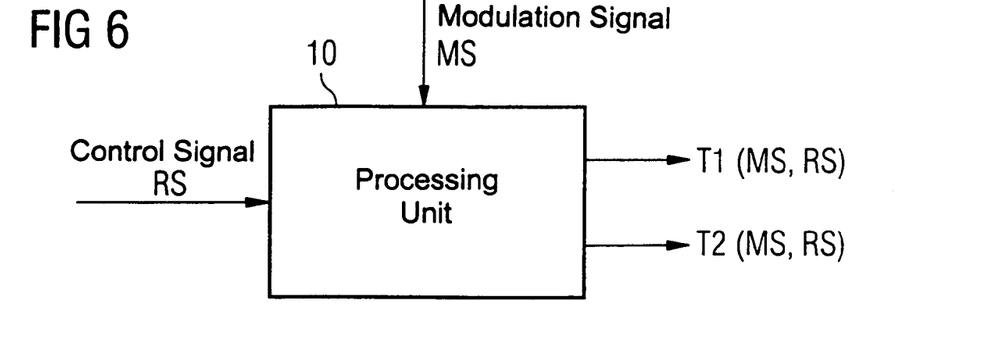
FIG. 6 is a block diagram of a configuration for determining the first and second pulse durations as a function of the control signal and of the modulation signal.

FIG. 6 shows a processing unit 10, to which the control signal RS which governs the power consumption as well as a modulation signal MS which modulates the pulse duration of at least one of the switching-on pulses are supplied, and the first and second pulse durations T1, T2, from which the control signal RS and the modulation signal MS are determined. The processing unit 10 may, for example, contain a look-up table, containing two associated pairs of values for the first pulse duration T1 and for the second pulse duration T2 for various control signals and various modulation signals. The processing unit 10 may also be in the form of a calculation unit, which determines the second pulse duration on the basis of the equations (1) and (2) explained above, for a predetermined control signal RS and a first pulse duration that is governed by the modulation signal MS.

Figure 7A:
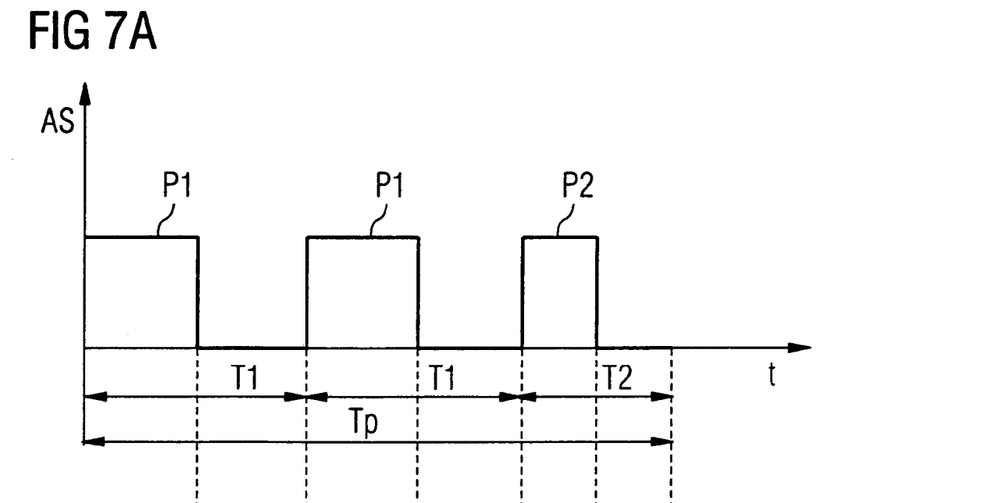
FIG. 7A is a time profile of a pulse sequence with two first switching-on pulses with a first pulse duration and with one second switching-on pulse with a second pulse duration.
Figure 7B:
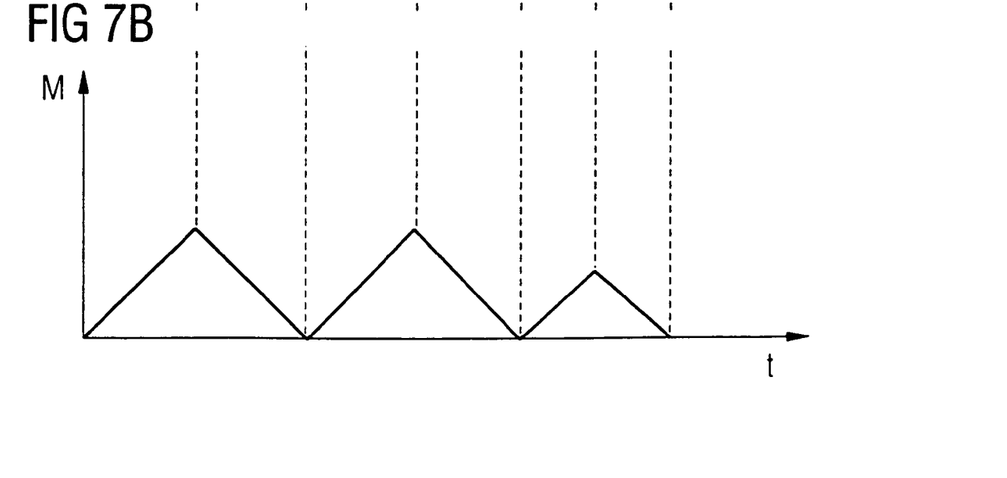
FIG. 7B is a graph showing a time profile of the magnetization of the primary coil resulting from such a pulse sequence.
Figure 8:
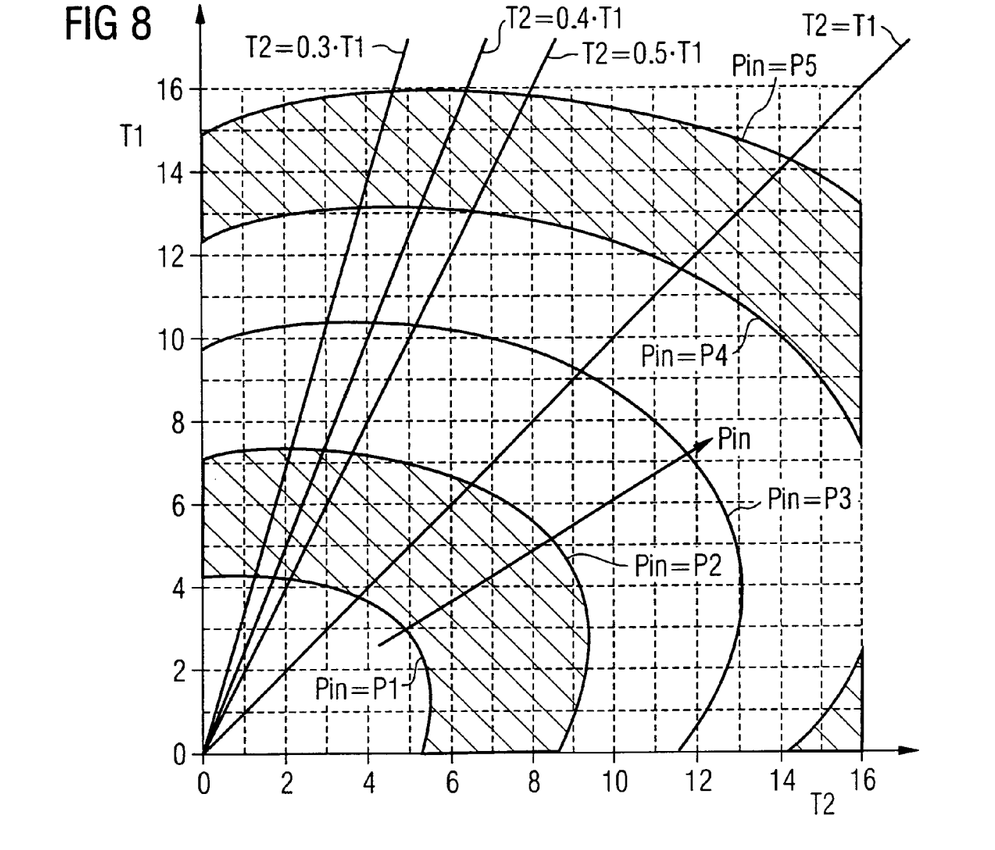
FIG. 8 is a graph showing a diagram of power consumed by a free-running switch mode power supply as a function of the first pulse duration and of the second pulse duration for a pulse sequence as shown in FIG. 7A.

FIG. 7A shows a pulse sequence which contains two first switching-on pulses P1 with the pulse duration T1, and a second switching-on pulse P2 with the pulse duration T2. FIG. 7B shows the magnetization profile of the primary coil Lp for a pulse sequence such as this during one drive cycle. The mean power level Pin consumed by the free-running switch mode power supply is illustrated schematically in FIG. 8, and is dependent on the first pulse duration T1 and on the second pulse duration T2. FIG. 8 shows a number of elliptical curves, with the mean power consumed on each of these curves being constant, and with the power consumption increasing as the distance between the respective curve and the origin increases. The curves that are illustrated in FIG. 8 clearly show that the first and second pulse durations T1, T2 can fluctuate within a wide range in order to achieve a predetermined mean power consumption, and in which case the associated second pulse duration T2 for each first pulse duration T1 can be determined from the curves. The curve that is illustrated in FIG. 8 may, for example, be stored in the form of a table in the processing unit 10 as shown in FIG. 6, in order, by way of example, to determine the associated second pulse duration T2 for a first pulse duration T1 that is modulated, for example, by a modulation signal.

One embodiment of the invention provides for the first pulse duration T1 to be set as a function of the control signal RS, and hence matched to the power consumption of the load, and for the second pulse duration T2 to be chosen to be proportional to the first pulse duration T1, with the proportionality factor varying as a function of a modulation signal within predetermined limits, so that the total switched-on time is dependent not only on the control signal RS but also on the modulation signal MS, in order to provide frequency modulation for the drive signal.

Starting from the origin, FIG. 8 shows three radially running lines, with one of the lines showing the values for the power consumed when the second pulse duration T2 is 0.3 times or 30% of the first pulse duration T1, the second pulse duration is 0.4 times or 40% of the first pulse duration T1, and the second pulse duration T2 is 0.5 times or 50% of the first pulse duration T1. If the elliptical power curves in the region between these lines are considered, then it can be seen that the power curves run approximately horizontally in this area, which results in that, for a predetermined value of the first pulse duration T1, fluctuations in the second pulse duration T2 within a range which is between 30% and 50% of the first pulse duration T1 do not result in any significant change to the mean power consumption. This is made use of in the embodiment which has been mentioned, in which the first pulse duration T1 is set exclusively as a function of the control signal RS and the second pulse duration T2 is set exclusively as a function of the first pulse duration T1 and of a modulation signal, with the modulation signal governing the fluctuation range of the second pulse duration T2. This fluctuation range preferably covers a range between 30% and 50% of the first pulse duration for a pulse sequence with two first switching-on pulses and one second switching-on pulse.

The time sequence of the first switching-on pulses P1 and of the second switching-on pulse P2 within the pulse sequence may, of course, be varied as required, and is not dependent on the sequence illustrated in FIG. 7A.

There may, of course, be any desired number of m first pulses M1 and n second pulses P2, which form recurrent pulse sequences in time, with different power curves being produced for each of these combinations, resulting in different variation ranges, within which the second pulse duration can be varied independently of the first pulse duration, without needing to significantly vary the mean power consumption.

Figure 9:
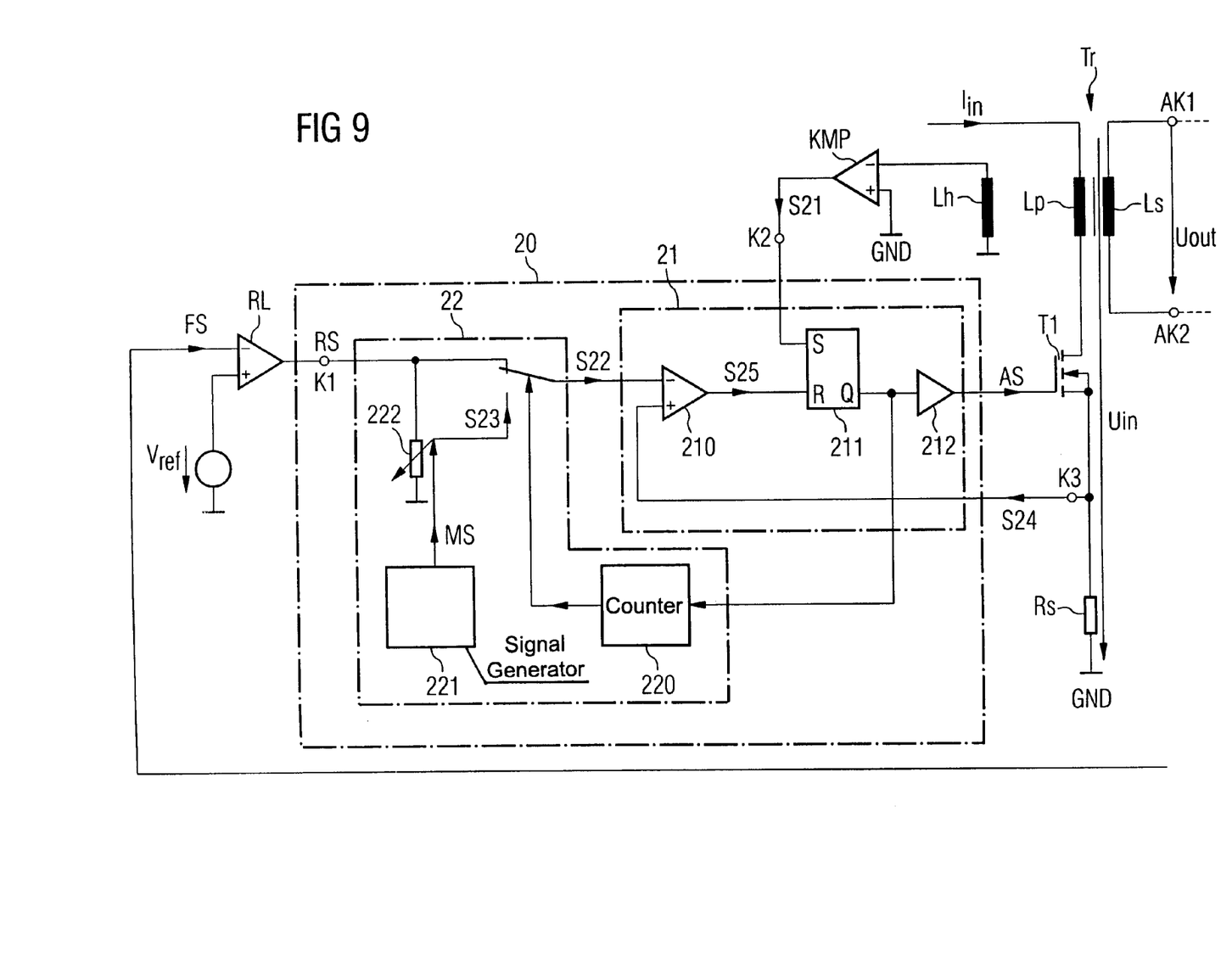
FIG. 9 is a detail of a circuit diagram of a free-running switch mode power supply with a drive circuit according to the invention for producing a drive signal for a switch, which is connected in series with a transformer, in the power supply unit.

FIG. 9 shows a drive circuit 20 for the switch T1 that is connected in series with the primary coil Lp of the transformer Tr in a free-running circuit section. The drive circuit 20 produces the drive signal AS with a recurrent pulse sequence which contains at least one first switching-on pulse and at least one second switching-on pulse. The pulse duration of one of the pulses is in this case set to be dependent on a control signal RS, and the pulse duration of the other pulse is dependent on the one pulse duration and is modulated by a modulation signal MS.

The drive circuit 20 has a first connecting terminal K1 to which the control signal RS is applied, which determines the power consumption of the power supply unit. The control signal RS is determined from the output voltage Uout in a manner that has been known for a long time, and as has been explained above, by way of example, with reference to FIG. 1. In the example shown in FIG. 9, the control signal RS is provided by a regulator RL, to which a reference voltage Vref and a feedback signal FS, which is dependent on the output voltage Uout, are supplied, and which determines any difference between the reference signal Vref and the feedback signal FS. The regulator RL is, by way of example, a proportional regulator, a proportional integral regulator, or an integral regulator. The control signal RS in the example being explained becomes greater the higher the power consumption of a load which is connected to the output terminals AK1, AK2, with the power consumption being determined on the basis of the differences between the output voltage Uout and the reference value Vref.

The drive circuit 20 has a second input terminal K2, to which a magnetization signal S21 is supplied. The magnetization signal is determined by an auxiliary coil Lh, which is coupled to the primary coil Lp, and a comparator KMP, with the comparator KMP comparing the voltage across the auxiliary coil LH with a reference ground potential, to which the input voltage is also related, and produces a rising flank in the magnetization signal S21 once the voltage across the auxiliary coil Lh has fallen to the reference ground potential GND after demagnetization of the primary coil Lp.

The drive circuit 20 has a conventional signal generating circuit with a driver circuit 212, which provides the drive signal AS, an RS flip-flop 211, and a comparator 210. A set input S of the flip-flop 211 is in this case supplied with the magnetization signal S21, with the flip-flop 211 being set by each rising flank of the magnetization signal S21 in order in this way to switch on the power transistor T1 that, in the example, is in the form of an n-channel MOSFET. The flip-flop 211 is reset on the basis of an output signal from the comparator 210, in order to switch off the transistor T1. In order to produce the reset signal, the minus input of the comparator 210 is supplied with a reference signal S22 (from a reference signal generating circuit 22 which is still to be explained) and with a ramp signal S24. The ramp signal S24 is proportional to the input current Iin, which is likewise in the form of a ramp when the transistor T1 is closed, and, in the exemplary embodiment, is available in the form of a voltage across a resistor Rs that is connected in series with the primary coil Lp. The ramp signal S24 starts at zero when the transistor T1 is switched on, and rises linearly with time, with the flip-flop 211 being reset in order to switch off the transistor T1 when the ramp signal S24 rises above the reference signal S22.

Figure 10:
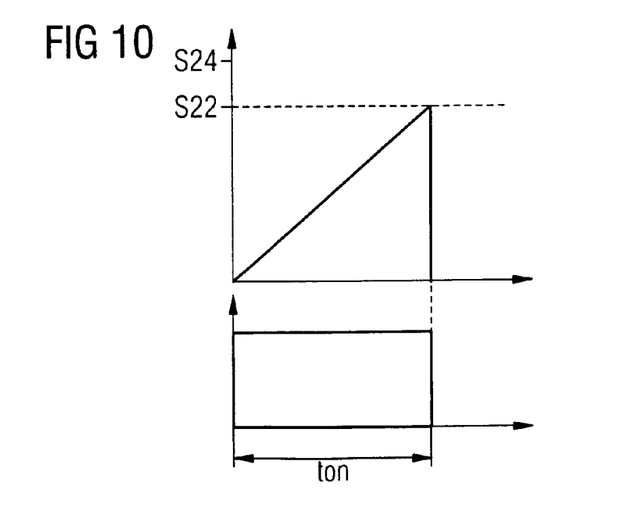
FIG. 10 is a graph showing time relationships for the production of a switching-on pulse.

FIG. 10 shows, schematically, the relationship between the gradient of the ramp signal S24, the amplitude of the reference signal S22 and the time ton for which the transistor T1 is switched on. This clearly shows that the switched-on duration ton is directly proportional to the reference signal S2, assuming that the gradient of the ramp signal S24 is constant. The gradient of the ramp signal S24 is once again dependent on the input voltage Uin, although this can be assumed to be constant, at least over a large number of drive cycles. If the input voltage Uin increases, then the control signal RS decreases, in order in this way to keep the power consumption constant.

In order to provide the reference signal S22, the drive circuit 20 has a reference signal generating circuit 22 with a signal generator 221 (which provides a modulation signal MS) and a weighting circuit 222. The reference signal generating circuit 22 also has a changeover switch 223 which, operated by a counter device 220, provides either the control signal RS or a weighted control signal S23 (which is provided by the weighting circuit 222) as the reference signal S22. The weighting circuit 222 has a voltage divider 222, which divides the control signal RS and has a tap at which the weighted control signal S23 is produced. Depending on whether the control signal RS or the signal S23 is used as the reference signal S22 for determining the switched-on duration in the signal generating circuit 21, switching-on pulses are produced at the output of the signal generating circuit, whose duration is proportional to the control signal RS, or switching-on pulses are produced whose duration is proportional to the weighted signal S23. If the signal profile has two first pulses P1 and one second pulse P2, the variation range within which the signal S22 can vary on the basis of the modulation signal MS is produced as illustrated in FIG. 8, such that the signal S23 has an amplitude which corresponds to between 30% and 50% of the amplitude of the control signal RS. In this case, the counter circuit 220 is configured such that it leaves the changeover switch 223 in a switch position in which the control signal RS is supplied as the reference signal S22 to the signal generating circuit 21 for the duration of two switching-on pulses in each case, in order to produce two first switching-on pulses P1 with a duration which is dependent on the control signal RS, and such that, after this, it changes the switch 223 for the duration of one switching-on pulse to a switch position in which the weighted control signal S23 is supplied as the reference signal S22 to the signal generating circuit 21, in order to produce a second switching-on pulse P2.

With other pulse sequences, in which a different number of first pulses are used and in which a different number of second pulses are used, the counter 220 is configured such that the changeover switch 223 is switched in order to achieve the desired pulse sequence.

I claim:

1. A method for operating a switch connected in series with a primary coil of a transformer in a free-running switch mode power supply, a secondary coil of the transformer being coupled to output terminals carrying an output voltage, the switch being switched on when the primary coil reaches a predetermined magnetization state, which comprises the steps of:
    applying an input voltage to a series circuit formed by the primary coil and the switch;
    providing a control signal for controlling power consumption;
    providing a modulation signal; and
    providing a drive signal for driving the switch, the drive signal containing a recurrent pulse sequence having at least one first switching-on pulse with a first pulse duration and at least one second switching-on pulse with a second pulse duration, a pulse duration of at least one of the first and second switching-on pulses being modulated by the modulation signal within a range predetermined by the control signal.

2. The method according to claim 1, which further comprises forming an overall time for which the first and second switching-on pulses are switched on, which is a sum of times for which all the pulses in the pulse sequence are switched on, to be dependent on the modulation signal.

3. The method according to claim 2, which further comprises setting relationships between the times for which the first and second switching-on pulses are switched on and the modulation signal such that a mean power level, which is recorded for each pulse sequence through input terminals, is at least approximately constant assuming that the control signal remains constant.

4. The method according to claim 2, which further comprises setting relationships between the times for which the first and second switching-on pulses are switched on and the modulation signal such that a mean power level, which is recorded for each pulse sequence through input terminals, is subject to fluctuations of less than 1% with respect to a mean value of the mean power level averaged over at least two pulse sequences, assuming that the control signal remains constant.

5. The method according to claim 1, which further comprises:
    setting the first pulse duration of the first switching-on pulse to be proportional to the control signal; and
    setting the second pulse duration of the second switching-on pulse to be proportional to the first pulse duration, with a proportionality factor by which the second pulse duration is dependent on the first pulse duration being modulated within predetermined limits by the modulation signal.

6. The method according to claim 5, which further comprises choosing limits within which the second pulse duration is varied such that a mean power level consumed by the switch mode power supply remains at least approximately constant, assuming that the control signal remains constant.

7. The method according to claim 5, which further comprises choosing limits within which the second switched-on duration is varied such that a mean power level consumed by the switch mode power supply is subject to fluctuations of less than 1%, assuming that the control signal remains the same.

8. The method according to claim 1, which further comprises forming the recurrent pulse sequence with m first switching-on pulses each having the first pulse duration, and n second switching-on pulses each having the second pulse duration.

9. The method according to claim 8, which further comprises setting m=2 and n=1.

10. The method according to claim 8, which further comprises setting the range within which the second pulse duration is modulated by the modulation signal to be between 0.3 times and 0.5 times the first pulse duration.

11. The method according to claim 1, which further comprises forming the modulation signal as one of a random signal and a pseudo-random signal.

12. The method according to claim 1, which further comprises forming the range within which the switched-on duration of the at least one of the first and second switching-on drive pulses in the recurrent pulse sequence, whose pulse duration is modulated by the modulation signal, to be dependent on a maximum magnetization of the primary coil in each switching-on process.

13. The method according to claim 12, wherein a difference between the first and the second pulse duration tends to zero when the power consumption is so high that the maximum magnetization of the primary coil is reached.

14. A drive circuit for a switch connected in series with a primary coil of a transformer of a free-running switch mode power supply, the drive circuit comprising:
   a first input terminal for receiving a control signal governing power consumption;
   a second input terminal for receiving a magnetization signal being dependent on a magnetization state of the primary coil;
   an output terminal providing a drive signal;
   a signal generating circuit connected to said output terminal and said second input terminal, said signal generating circuit receiving the magnetization signal and a reference signal being dependent on the control signal, said signal generating circuit generating the drive signal containing a sequence of switching-on pulses, a start of a switching-on pulse in each case being predetermined by the magnetization signal, and a duration of the switching-on pulse being predetermined by the reference signal;
   a reference signal generating circuit connected to said first input terminal and said signal generating circuit, said reference signal generating circuit receiving the control signal and generating the reference signal, said reference signal generating circuit containing:
      a signal generator providing a modulation signal;
      a weighting circuit connected to said signal generator and said first input terminal, said weighting circuit receiving the control signal and the modulation signal and providing a weighted control signal weighted on a basis of the modulation signal; and
      a changeover switch having switching positions, and on a basis of said switching positions, the control signal or the weighted control signal being provided as the reference signal.

15. The drive circuit according to claim 14, wherein said reference signal generating circuit has a counter connected to and operating said changeover switch and counts drive pulses in the drive signal.

16. The drive circuit according to claim 14, wherein said weighting circuit has a signal divider with a division ratio set within predetermined limits by the modulation signal, said signal divider receiving the control signal and has a signal tap at which the weighted control signal can be tapped off.

* * * * *